(12) United States Patent
Huang

(10) Patent No.: US 12,153,310 B2
(45) Date of Patent: Nov. 26, 2024

(54) DISPLAY PANEL AND MOBILE TERMINAL

(71) Applicant: WUHAN CHINA STAR OPTOELECTRONICS TECHNOLOGY CO., LTD., Hubei (CN)

(72) Inventor: Jianlong Huang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/609,741

(22) PCT Filed: Sep. 30, 2021

(86) PCT No.: PCT/CN2021/122293
§ 371 (c)(1),
(2) Date: Mar. 30, 2023

(87) PCT Pub. No.: WO2023/044960
PCT Pub. Date: Mar. 30, 2023

(65) Prior Publication Data
US 2024/0027840 A1    Jan. 25, 2024

(30) Foreign Application Priority Data
Sep. 23, 2021   (CN) .......................... 202111113803.4

(51) Int. Cl.
*G02F 1/1339*   (2006.01)
*G02F 1/1333*   (2006.01)
*G02F 1/1335*   (2006.01)

(52) U.S. Cl.
CPC ...... *G02F 1/1339* (2013.01); *G02F 1/133305* (2013.01); *G02F 1/133512* (2013.01)

(58) Field of Classification Search
CPC ............ G02F 1/1339; G02F 1/133305; G02F 1/133512
(Continued)

(56) References Cited

U.S. PATENT DOCUMENTS 7,889,306 B1    2/2011  Ko et al.
9,448,441 B2 *  9/2016  Moriwaki ............. G02F 1/1337
(Continued)

FOREIGN PATENT DOCUMENTS

CN        1560689 A      1/2005
CN       201111807 Y     9/2008
(Continued)

OTHER PUBLICATIONS

Written Opinion of the International Searching Authority in International application No. PCT/CN2021/122293, mailed on Apr. 29, 2022.
(Continued)

*Primary Examiner* — Dung T Nguyen
*Assistant Examiner* — David Y Chung
(74) *Attorney, Agent, or Firm* — PV IP PC; Wei Te Chung

(57) ABSTRACT

A first recess part is defined on an organic layer disposed in a non-display area, and a frame sealant is filled in the first recess part. A depth of the first recess part is less than a thickness of the organic layer. Therefore, a relative contact area between the frame sealant and a first substrate is increased. As such, strength of adhesion between the frame sealant and the substrate is further increased, and a capability of panels to pass peeling tests is improved.

14 Claims, 4 Drawing Sheets

(58) Field of Classification Search
USPC .................................................. 349/123, 153
See application file for complete search history.

(56) References Cited

U.S. PATENT DOCUMENTS

| | | | |
|---|---|---|---|
| 2002/0030769 A1 | 3/2002 | Bae | |
| 2002/0090494 A1 | 7/2002 | Song | |
| 2003/0122983 A1 | 7/2003 | Kim et al. | |
| 2004/0150776 A1 | 8/2004 | Kim | |
| 2011/0109866 A1 | 5/2011 | Ko et al. | |
| 2016/0133653 A1* | 5/2016 | Kim | G02F 1/1339 257/66 |
| 2021/0223588 A1* | 7/2021 | Ma | H01L 23/31 |
| 2022/0244586 A1* | 8/2022 | Zhao | G02F 1/1339 |

FOREIGN PATENT DOCUMENTS

| | | |
|---|---|---|
| CN | 101699335 A | 4/2010 |
| CN | 101713882 A | 5/2010 |
| CN | 102819146 A | 12/2012 |
| CN | 103323994 A | 9/2013 |
| CN | 103424936 A | 12/2013 |
| CN | 103869549 A | 6/2014 |
| CN | 103941460 A | 7/2014 |
| CN | 204241807 U | 4/2015 |
| CN | 105652526 A | 6/2016 |
| CN | 207366901 U | 5/2018 |
| CN | 108398835 A | 8/2018 |
| CN | 109270725 A | 1/2019 |
| CN | 110187570 A | 8/2019 |
| CN | 110426879 A | 11/2019 |
| CN | 110534547 A | 12/2019 |
| CN | 110824759 A | 2/2020 |
| CN | 110824785 A | 2/2020 |
| CN | 111158184 A | 5/2020 |
| CN | 111244039 A | 6/2020 |
| CN | 111477109 A | 7/2020 |
| CN | 212965698 U | 4/2021 |
| JP | H0572540 A | 3/1993 |
| JP | H0933933 A | 2/1997 |
| JP | H10282507 A | 10/1998 |
| JP | 2009128473 A | 6/2009 |
| JP | 2009175497 A | 8/2009 |

OTHER PUBLICATIONS

Chinese Office Action issued in corresponding Chinese Patent Application No. 202111113803.4 dated Apr. 14, 2022, pp. 1-10.
International Search Report in International application No. PCT/CN2021/122293, mailed on Apr. 29, 2022.

* cited by examiner

DISPLAY PANEL AND MOBILE TERMINAL

RELATED APPLICATIONS

This application is a Notional Phase of PCT Patent Application No. PCT/CN2021/122293 having international filing date Sep. 30, 2021, which claims the benefit of priority of Chinese Patent Application No. 202111113803.4 filed on Sep. 23, 2021. The contents of the above applications are all incorporated by reference as if fully set forth herein in their entirety.

FIELD

The present disclosure relates to a field of display technologies, and more particularly, to a display panel and a mobile terminal.

BACKGROUND

Thin-film transistor liquid crystal displays (TFT-LCDs) are one of LCDs and apply TFT technologies to improve quality of an image. The TFT-LCDs can be formed of two substrates opposite to each other. Field-generating electrodes, such as pixel electrodes and common electrodes, are formed on the substrates.

Currently, TFT-LCDs having a narrow frame are a development trend of display technologies and are a goal pursued by people. However, narrow-frame designs are limited by certain conditions, such as peeling tests and boiling tests, of panels. Wherein, to ensure that the panels can pass the peeling tests, strength of adhesion between a frame sealant and a substrate needs to be ensured. That is, a relative contact area between the frame sealant and the substrate needs to be ensured. Nowadays, in conventional technologies, a through-hole is commonly defined on an organic layer between the frame sealant and the substrate, and the frame sealant is filled in the through-hole. Therefore, the relative contact area between the frame sealant and the substrate can be increased.

In a frame position of TFT-LCDs, a plurality of metal lines are disposed between the substrate and the organic layer, and the through-hole of the organic layer is defined between adjacent metal lines. However, because a frame of the TFT-LCDs becomes narrower and narrower, a distance between the metal lines becomes smaller and smaller. Moreover, an arrangement of the metal lines in the frame position is complicated, limiting a position and a width of the through-hole of the organic layer. Therefore, the relative contact area between the frame sealant and the substrate is affected, resulting in failure of the peeling tests of the panels.

SUMMARY

Embodiments of the present disclosure provide a display panel and a mobile terminal to solve defects of conventional technologies.

To achieve the above goal, technical solutions provided by the embodiments of the present disclosure are described below.

A display panel, comprising a first substrate and a second substrate disposed opposite to each other, and a liquid crystal layer and a frame sealant which are disposed between the first substrate and the second substrate.

The display panel comprises a display area and a non-display area adjacent to the display area, and the frame sealant is disposed in the non-display area.

Wherein, the first substrate comprises a first base and an organic layer disposed on a side of the first base adjacent to the second substrate, the organic layer comprises a first recess part defined in the non-display area, the frame sealant is filled in the first recess part, and a depth of the first recess part is less than a thickness of the organic layer.

In the display panel provided by an embodiment of the present disclosure, the first substrate comprises a plurality of metal lines disposed between the first base and the organic layer; and
  an orthographic projection of the first recess part on the first base at least overlaps a part of an orthographic projection of the metal lines on the first base.

In the display panel provided by an embodiment of the present disclosure, the organic layer comprises a second recess part defined in the non-display area, and the frame sealant is filled in the second recess part; and
  a depth of the second recess part defined in the first substrate is equal to the thickness of the organic layer, and the second recess part is defined between the metal lines.

In the display panel provided by an embodiment of the present disclosure, a distance between the second recess part and the display area is greater than a distance between the first recess part and the display area.

In the display panel provided by an embodiment of the present disclosure, the first substrate comprises a first alignment layer disposed between the organic layer and the frame sealant, the depth of the first recess part is greater than a thickness of the first alignment layer, and the first alignment layer is attached to a surface of the organic layer and an internal wall of the first recess part.

In the display panel provided by an embodiment of the present disclosure, the first substrate comprises a first alignment layer disposed between the organic layer and the frame sealant; and
  the first alignment layer comprises a first opening corresponding to the first recess part, and the frame sealant is filled in the first opening and the first recess part.

In the display panel provided by an embodiment of the present disclosure, the first recess part and the second recess part both have a ring-shaped recess structure surrounding the display area.

In the display panel provided by an embodiment of the present disclosure, the first recess part and the second recess part both have an independent recess structure surrounding the display area.

In the display panel provided by an embodiment of the present disclosure, the second substrate comprises a second base and a black barrier disposed on a side of the second base adjacent to the first substrate, the black barrier comprises a third recess part defined in the non-display area, and the frame sealant is filled in the third recess part.

Wherein, a depth of the third recess part is less than a thickness of the black barrier.

In the display panel provided by an embodiment of the present disclosure, the second substrate comprises a second alignment layer disposed on a side of the black barrier adjacent to the first substrate; and
  the second alignment layer comprises a second opening corresponding to the third recess part, and the frame sealant is filled in the second opening and the third recess part.

In the display panel provided by an embodiment of the present disclosure, the organic layer comprises a plurality of first recess parts, and the first recess parts have different depths.

An embodiment of the present disclosure further provides a mobile terminal, comprising a terminal main body and a display panel which are integrated, wherein the display panel a comprises first substrate and a second substrate disposed opposite to each other, and a liquid crystal layer and a frame sealant which are disposed between the first substrate and the second substrate;

wherein the display panel comprises a display area and a non-display area adjacent to the display area, and the frame sealant is disposed in the non-display area; and the first substrate comprises a first base and an organic layer disposed on a side of the first base adjacent to the second substrate, the organic layer comprises a first recess part defined in the non-display area, the frame sealant is filled in the first recess part, and a depth of the first recess part is less than a thickness of the organic layer.

In the mobile terminal provided by an embodiment of the present disclosure, the first substrate comprises a plurality of metal lines disposed between the first base and the organic layer; and an orthographic projection of the first recess part on the first base at least overlaps a part of an orthographic projection of the metal lines on the first base.

In the mobile terminal provided by an embodiment of the present disclosure, the organic layer comprises a second recess part defined in the non-display area, and the frame sealant is filled in the second recess part; and a depth of the second recess part defined in the first substrate is equal to the thickness of the organic layer, and the second recess part is defined between the metal lines.

In the mobile terminal provided by an embodiment of the present disclosure, a distance between the second recess part and the display area is greater than a distance between the first recess part and the display area.

In the mobile terminal provided by an embodiment of the present disclosure, the first substrate comprises a first alignment layer disposed between the organic layer and the frame sealant, the depth of the first recess part is greater than a thickness of the first alignment layer, and the first alignment layer is attached to a surface of the organic layer and an internal wall of the first recess part.

In the mobile terminal provided by an embodiment of the present disclosure, the first substrate comprises a first alignment layer disposed between the organic layer and the frame sealant; and the first alignment layer comprises a first opening corresponding to the first recess part, and the frame sealant is filled in the first opening and the first recess part.

In the mobile terminal provided by an embodiment of the present disclosure, the first recess part and the second recess part both have a ring-shaped recess structure surrounding the display area.

In the mobile terminal provided by an embodiment of the present disclosure, the first recess part and the second recess part both have an independent recess structure surrounding the display area.

In the mobile terminal provided by an embodiment of the present disclosure, the second substrate comprises a second base and a black barrier disposed on a side of the second base adjacent to the first substrate, the black barrier comprises a third recess part defined in the non-display area, and the frame sealant is filled in the third recess part.

Wherein, a depth of the third recess part is less than a thickness of the black barrier.

Regarding the beneficial effects: embodiments of the present disclosure provide a display panel and a mobile terminal. The display panel includes a first substrate and a second substrate disposed opposite to each other, and a liquid crystal layer and a frame sealant disposed between the first substrate and the second substrate. The display panel includes a display area and a non-display area adjacent to the display area, and the frame sealant is disposed in the non-display area. Wherein, the first substrate includes a first base and an organic layer disposed on a side of the first base adjacent to the second substrate. The organic layer includes a first recess part defined in the non-display area, and the frame sealant is filled in the first recess part. A depth of the first recess part is less than a thickness of the organic layer. In the present disclosure, the first recess part is disposed on the organic layer in the non-display area, the frame sealant is filled in the first recess part, and the depth of the first recess part is less than the thickness of the organic layer. Therefore, a relative contact area between the frame sealant and the first substrate is increased. As such, strength of adhesion between the frame sealant and the first substrate is increased, and a capability of the display panel to pass peeling tests is improved.

DESCRIPTION DRAWINGS

DETAILED DESCRIPTION

The present disclosure provides a display panel and a mobile terminal. Hereinafter preferred embodiments of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

The display panel and the mobile terminal provided by embodiments of the present disclosure are respectively described below. It should be noted that a description order of following embodiments does not refer to a preferred description order of the embodiments.

Figure 1:
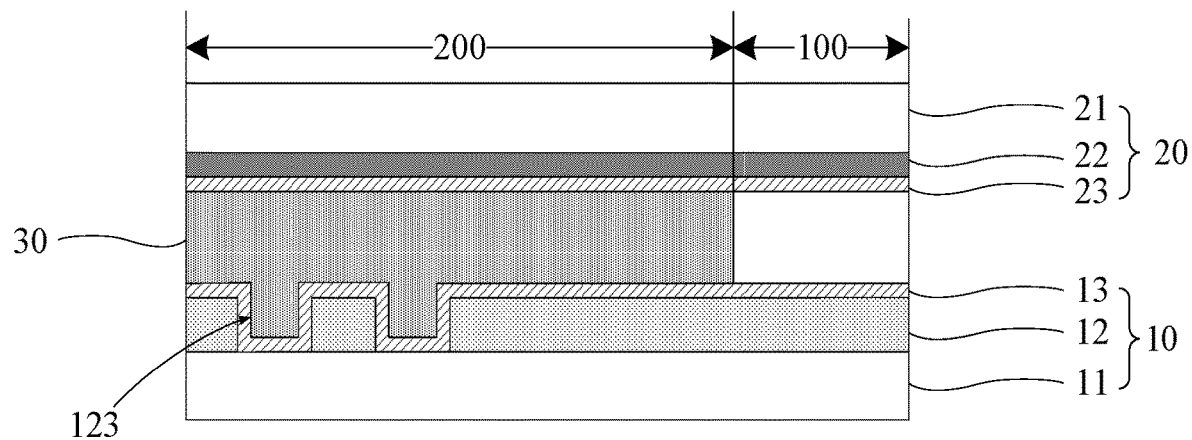
FIG. 1 is a structural schematic view showing a conventional display panel.
Figure 2:
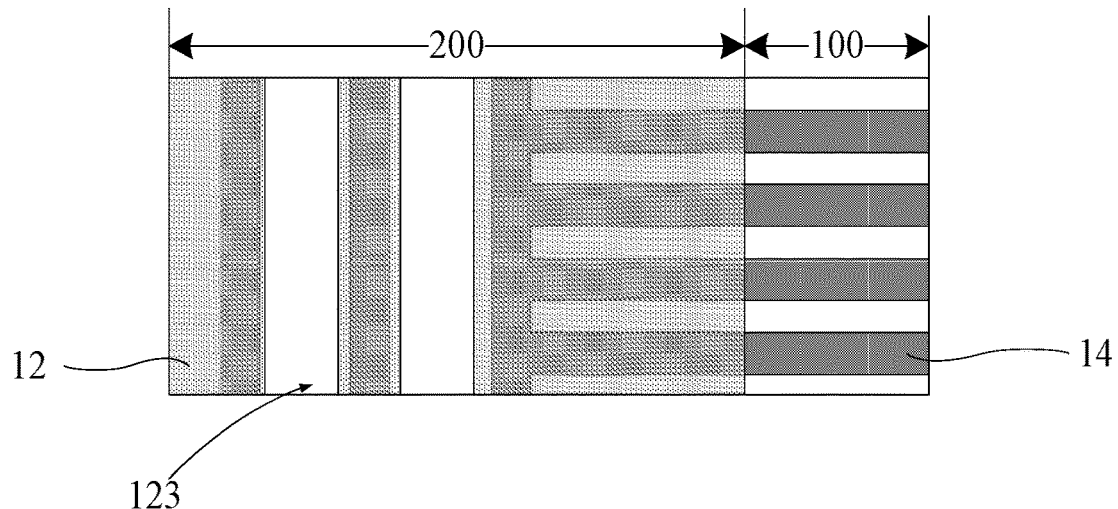
FIG. 2 is a top view showing an organic layer of the conventional display panel.

Please refer to FIGS. 1 to 2. Wherein, FIG. 1 is a structural schematic view showing a conventional display panel, and FIG. 2 is a top view showing an organic layer of the conventional display panel.

Conventional display panels usually include a first substrate 10 and a second substrate 20 disposed opposite to each other, and a liquid crystal layer (not shown) and a frame sealant 30 disposed between the first substrate 10 and the second substrate 20. The display panel includes a display area 100 and a non-display area 200 adjacent to the display area 100, and the frame sealant 30 is disposed in the non-display area 200. Wherein, the first substrate 10 includes a first base 11, an organic layer 12 disposed on a side of the first base 11 adjacent to the second substrate 20, a first alignment layer 13, and a plurality of metal lines 14 disposed between the first substrate 11 and the organic layer 12. The second substrate 20 includes a second base 21, and a black barrier 22 and a second alignment layer 23 sequentially disposed on a side of the second base 21 adjacent to the first substrate 10.

Currently, display panels having a narrow frame are a development of display technologies and are a goal pursued by human. However, narrow-frame designs are limited by certain conditions, such as peeling tests and boiling tests, of panels. Wherein, to ensure that the panels can pass the peeling tests, strength of adhesion between the frame sealant 30 and the substrate needs to be ensured. That is, a relative contact area between the frame sealant 30 and the substrate needs to be ensured. Commonly, in conventional technologies, a width of the frame sealant 30 is increased, a through-hole 123 is defined on the organic layer 12 and is defined between the metal lines 14, and the frame sealant 30 is filled in the through-hole 123. Therefore, the relative contact area between the frame sealant 30 and the first substrate 10 is increased, and a capability of the display panels to pass peeling tests is improved.

However, because a frame of the display panels becomes narrower and narrower, a distance between the metal lines 14 becomes smaller and smaller. Moreover, an arrangement of the metal lines 14 at the frame sealant 30 position is complicated, limiting a position and a width of the through-hole 123 of the organic layer 12. Therefore, the relative contact area between the frame sealant 30 and the substrate 10 is affected, resulting in failure of peeling tests of the display panels. To solve this issue, the embodiments of the present disclosure provide a display panel and a mobile terminal to effectively improve a capability of display panels to pass peeling tests.

Please refer to FIGS. 3 to 6. The present disclosure provides a display panel. The display panel includes a first substrate 10 and a second substrate 20 disposed opposite to each other. and a liquid crystal layer (not shown) and a frame sealant 30 disposed between the first substrate 10 and the second substrate 20. The display panel includes a display area 100 and a non-display area 200 adjacent to the display area 100. The frame sealant 30 is disposed in the non-display area 200. Wherein, the first substrate 10 includes a first base 11 and an organic layer 12 disposed on a side of the first base 11 adjacent to the second substrate 20. The organic layer 12 includes a first recess part 121 defined in the non-display area 200, and the frame sealant 30 is filled in the first recess part 121. A depth of the first recess part 121 is less than a thickness of the organic layer 12.

In the present disclosure, the first recess part 121 is defined on the organic layer 12 in the non-display area, the frame sealant 30 is filled in the first recess part 121, and the depth of the first recess part 121 is less than the thickness of the organic layer 12. Therefore, a relative contact area between the frame sealant 30 and first substrate 101 is increased. As such, strength of adhesion between the frame sealant 30 and the first substrate 10 is increased, and a capability of the display panel to pass peeling tests is improved.

Technical solutions provided by the present disclose are described below in conjunction with specific embodiments.

Figure 3:
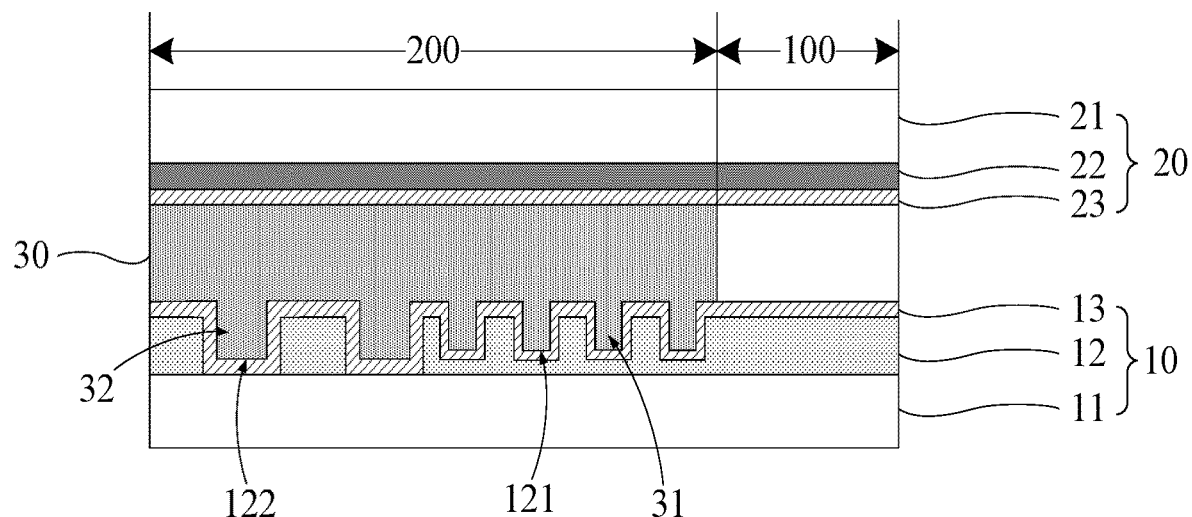
FIG. 3 is a first structural schematic view showing a display panel provided by an embodiment of the present disclosure.

Please refer to FIG. 3, a first structural schematic view showing a display panel provided by an embodiment of the present disclosure is provided.

The present embodiment provides a display panel. The display panel includes, but is not limited to, a light-emitting diode (LED) panel. The present embodiment does not limit the display panel. Wherein, the display panel includes, but is not limited to, conventional layers such as a gate, an insulating layer, an active layer, a source/drain layer, etc. which are sequentially stacked. The conventional layers are not described in detail here. It should be noted that the LED panel is taken as an example to describe the display panel of the present disclosure.

In the present embodiment, the display panel includes a first substrate and a second substrate 20 disposed opposite to each other, and a liquid crystal layer (not shown) and a frame sealant 30 disposed between the first substrate 10 and the second substrate 20.

Specifically, the first substrate 10 includes, but is not limited to, an array substrate. The second substrate 20 includes, but is not limited to, a color filter substrate. In the present embodiment, exemplary, the first substrate 10 is the array substrate, and the second substrate 20 is the color filter substrate.

The display panel includes a display area 100 and a non-display area 200 adjacent to the display area 100, and the frame sealant 30 is disposed in the non-display area 200. Wherein, the first substrate 10 includes a first base 11 and an organic layer 12 disposed on a side of the first base 11 adjacent to the second substrate 20.

Furthermore, the first base 11 may include a rigid substrate or a flexible substrate. When the first base 11 is the rigid substrate, a material thereof may be metal or glass. When the first base 11 is the flexible substrate, the material thereof may be at least one of an acrylic resin, a methacrylic acid resin, polyisoprene, a vinyl ester resin, an epoxy, a polyurethane resin, a cellulose resin, a silicone resin, a polyimide resin, or a polyamide resin. The present embodiment does not limit the material of the first base 11.

In the present embodiment, the organic layer 12 includes, but is not limited to, a planarization layer. The organic layer 12 includes a first recess part 121 defined in the non-display area, and the frame sealant 30 is filled in the first recess part 121. A depth of the first recess part 121 is less than a thickness of the organic layer 12. It should be understood that, in the present embodiment, the first recess part 121 is defined on the organic layer 12 in the non-display area, the frame sealant 30 is filled in the first recess part 121, and the depth of the first recess part 121 is less than the thickness of the organic layer 12. As such, a relative contact area between the frame sealant 30 and the first substrate 10 is increased. Therefore, strength of adhesion between the frame sealant 30 and the first substrate 10 is increased, thereby improving a capability of the display panel to pass peeling tests.

It should be noted that, in the present embodiment, the first substrate 10 further includes a first alignment layer 13 disposed between the organic layer 12 and the frame sealant 30. The depth of the first recess part 121 is greater than a thickness of the first alignment layer 13. The first alignment layer 13 is attached to a surface of the organic layer 12 and an internal wall of the first recess part 121.

It should be understood that, in another embodiment, the first alignment layer 13 includes a first opening corresponding to the first recess part 121, and the frame sealant 30 is filled in the first opening and the first recess part 121. Therefore, the relative contact area between the frame sealant 30 and the first substrate 10 is further increased. As such, strength of adhesion between the frame sealant 30 and the first substrate 10 is further increased, thereby improving the capability of the display panel to pass the peeling tests.

It should be noted that, in the present embodiment, the organic layer 12 and the first alignment layer 13 are sequentially disposed on a side of the first substrate 11 adjacent of the second substrate 20. Then, the first opening is defined on the first alignment layer 13. Finally, a halftone process is performed on a position corresponding to the first opening to form the first recess part 121.

Figure 4:
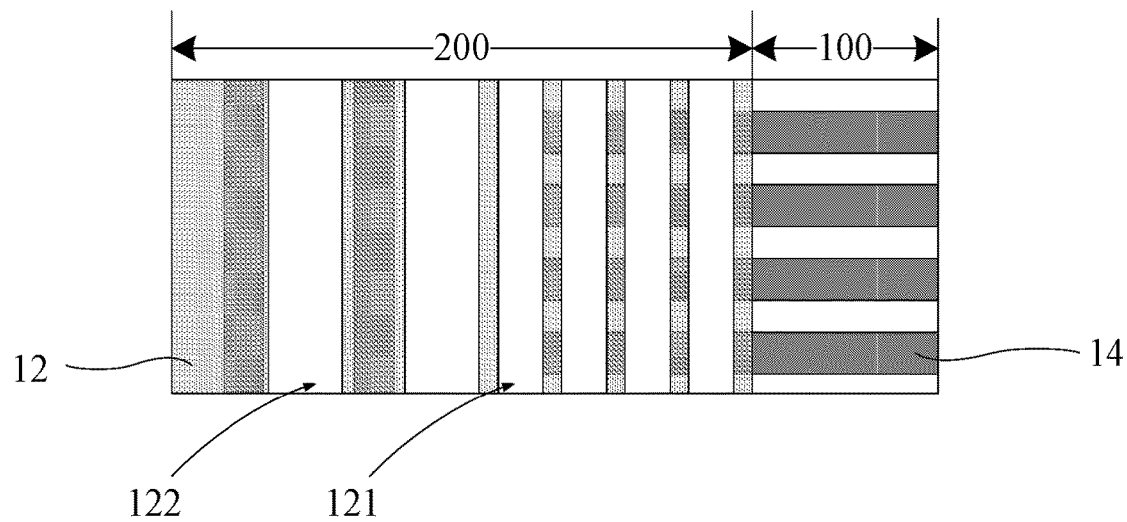
FIG. 4 is a top view showing an organic layer of the display panel provided by the embodiment of the present disclosure.

Furthermore, please refer to FIG. 4, a top view of the organic layer of the display panel provided by the present embodiment of the present disclosure is provided.

In the present embodiment, the first substrate 10 includes a plurality of metal lines 14 disposed between the first substrate 11 and the organic layer 12. The metal lines 14 are densely arranged on the first substrate 10. A material of the metal lines 14 may include at least one of metal such as Mo, Al, Pt, Pd, Ag, Mg, Au, Ni, Nd, Ir, Cr, Ca, Ti, Ta, or W.

In the present embodiment, the organic layer 12 covers the metal lines 14, thereby protecting the metal lines 14. Therefore, the first substrate 10 can be prevented from being damaged due to high temperature and high humidity. In addition, a terminal side can be prevented from being covered during a coating process of the alignment layer 13.

Specifically, in the present embodiment, an orthographic projection of the first recess part 121 on the first base 11 at least covers a part of an orthographic projection of the metal lines 14 on the first substrate 11. Furthermore, the orthographic projection of the first recess part 121 on the first substrate 11 is perpendicular to the metal lines 14.

Please refer to FIG. 1, FIG. 2, FIG. 3 and FIG. 4 together. In conventional technologies, the through-hole 123 is defined on the organic layer 12 and is defined between the metal lines 14, and the frame sealant 30 is filled in the through-hole 123. Therefore, the relative contact area between the frame sealant 30 and the first substrate 10 is increased, and the capability of the panels to pass the peeling tests is further improved. In the present embodiment, the first recess part 121 is defined on the organic layer 12 in the non-display area 200, the depth of the first recess part 121 is less than the thickness of the organic layer 12, the frame sealant 30 is filled in the first recess part 121, and the orthographic projection of the first recess part 121 on the first substrate 11 at least overlaps a part of the orthographic projection of the metal lines 14 on the substrate 11. Therefore, the relative contact area between the frame sealant and the first substrate 10 is increased. As such, strength of adhesion between the frame sealant 30 and the first substrate 10 is further increased, thereby improving the capability of the display panel to pass the peeling tests.

It should be understood that because a frame of display panels becomes narrower and narrower, a distance between metal lines 14 becomes smaller and smaller. Therefore, the metal lines 14 at the frame sealant 30 is are complicated, limiting a position and a width of the through-hole 123 defined on the organic layer 12. Compared with conventional technologies which have the through-hole 123 confined between the metal lines 14, in the present embodiment, the depth of the first recess part 121 is less than the thickness of the organic layer 12. Therefore, the first recess part 121 does not expose the metal lines 14. As such, in the present embodiment, a position of the first recess part 121 is irrelevant to a position of the metal lines 14. That is, the position of the first recess part 121 is not limited by the metal lines 14, thereby simplifying manufacturing processes of the display panel. In addition, a number of the first recess part 121 is not limited by the present embodiment. For example, in one embodiment, the organic layer 12 may include multiple first recess parts 121 defined in the non-display area 200. Wherein, the first recess parts 121 may have different depths. By increasing the number of the first recess parts 121, the relative contact area between the frame sealant 30 and the first substrate 10 can be increased. Therefore, strength of adhesion between the frame sealant and the first substrate 10 is ensured, thereby improving the capability of the display panel to pass the peeling tests.

It should be understood that, in the present embodiment, the depths of the first recess parts 121 may be equal or different. The depths of the first recess parts 121 are not limited by the present embodiment. It should be noted that, in the present embodiment, multiple first recess parts 121 having equal depth are taken as an example for description.

Furthermore, in the present embodiment, the organic layer 12 includes a second recess part 121 defined in the non-display area, and the frame sealant is filled in the second recess part 122. A depth of the second recess part 122 defined in the first substrate 10 is equal to a thickness of the second recess part 122, and the second recess part 122 is defined between the metal lines 14.

Specifically, in the present embodiment, a distance between the second recess part 122 and the display area 100 is greater than a distance between the first recess part 121 and the display area 100. It should be understood that moisture and oxygen easily enter the organic layer 12. Thus, in the present embodiment, the second recess part 122 is defined on the organic layer 12 and is defined on a side of the first recess part 121 away from the display area 100, and the depth of the second recess part 122 is equal to the thickness of the first recess part 121. As such, moisture and oxygen are prevented from entering the display area 100 from a side of the organic layer 12 in the non-display area 200, thereby protecting the display panel from an invasion of moisture and oxygen and improving a display effect.

It should be noted that, the arrangement of the distance between the second recess part 122 and the display area 100 greater than the distance between the first recess part 121 and the display area is taken as an example only for description. The present embodiment does not limit a position of the second recess part 122.

Figure 5:
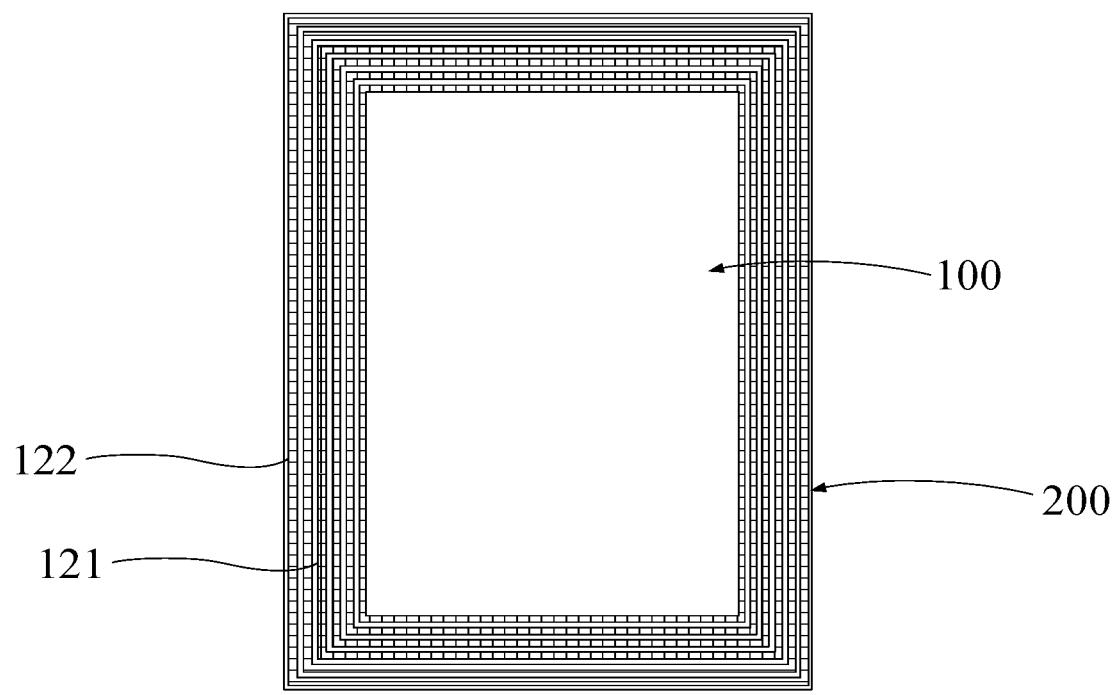
FIG. 5 is a first top view showing the display panel provided by the embodiment of the present disclosure.

Please refer to FIG. 5, a first top view of the display panel provided by the present embodiment of the present disclosure.

In the present embodiment, the first recess part 121 and the second recess part 122 both have a ring-shaped recess structure surrounding the display area 100. Both the first recess part 121 and the second recess part 122 are continuously defined on the organic layer 12.

Specifically, in the present embodiment, both the first recess part 121 and the second recess part 122 are continuously formed along a periphery direction of an are where the frame sealant 30 is disposed. Furthermore, the organic layer 12 includes four first recess parts 121 which can be formed by a halftone process. Wherein, a halftone mask includes a translucent area. Two second recess parts 122 are formed on an area corresponding to a transparent area of the organic layer 12. Moreover, the frame sealant 30 includes four first protrusions 31 and two second protrusions 32. The first protrusions 31 correspond to the first recess parts 121, and the second protrusions 32 correspond to the second recess parts 122.

It should be understood that the present embodiment does not limit a number of the first recess part 121, a number of the second recess part 122, a number of the first protrusion 31, and a number of the second protrusion 32. Arrangements of the organic layer 12 including four first recess parts 121 and two second recess parts 122 and the frame sealant 30 including four first protrusions 31 and two second protrusions 32 are taken as an example only for description.

It should be understood that the present embodiment does not limit the number of the first recess part 121, the number of the second recess part 122, the number of the first protrusion 31, and the number of the second protrusion 32.

It should be noted that, in the present embodiment, a cross-sectional shape of the first recess part 121 and a cross-sectional shape of the second recess part 122 both include, but are not limited to, a triangle, a rectangle, or an arc.

In the present embodiment, the first recess part 121 is disposed around a periphery of the display area 100. The first recess part 121 has a ring-shaped recess structure, thereby increasing the relative contact area between the frame sealant 30 and the first substrate 10. Therefore, strength of adhesion between the frame sealant 30 and the first substrate 10 is increased. In addition, this arrangement better prevents moisture and oxygen from entering the display area 100 from a side of the organic layer 12 in the non-display area 200, thereby protecting the display panel from an invasion of moisture and oxygen and improving a display effect. Because the second recess part 122 is disposed around the periphery of the display area 100 and has the ring-shaped recess structure, the relative contact area between the frame sealant 30 and the first substrate 10 can be increased. Therefore, strength of adhesion between the frame sealant 30 and the first substrate 10 can be increased, thereby improving the capability of the display panel to pass the peeling tests. In addition, this arrangement can protect the metal lines 14, can prevent the first substrate 10 from being damaged due to high temperature and high humidity, and can prevent a useful pattern at a terminal side from being covered during a polyimide (PI) coating process.

Figure 6:
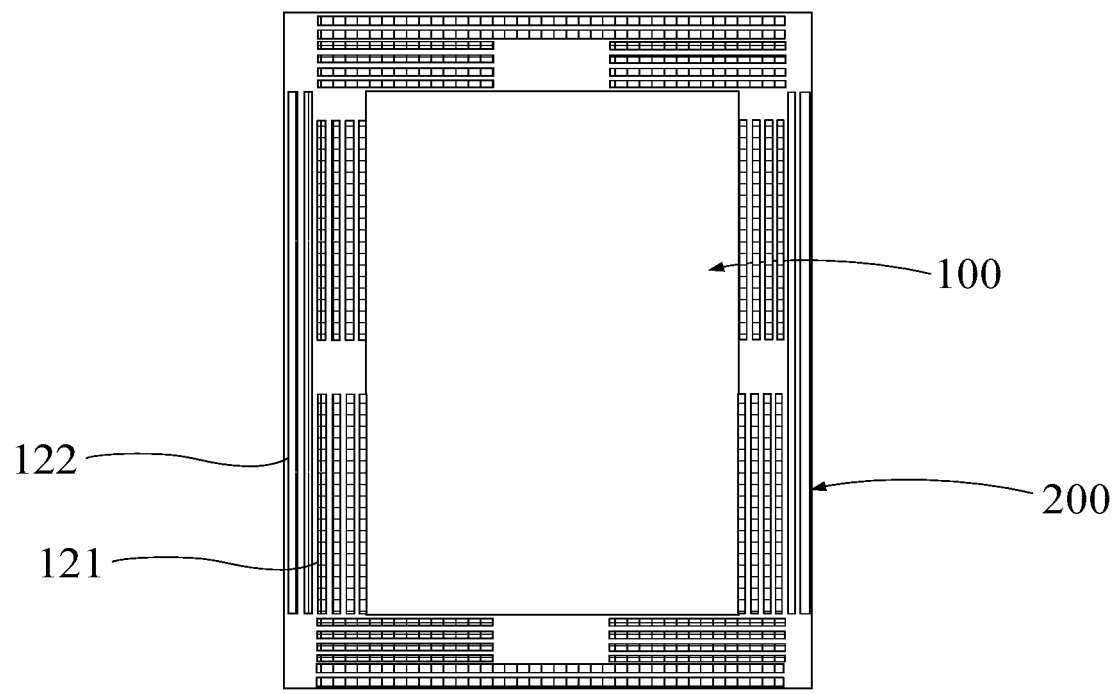
FIG. 6 is a second top view showing the display panel provided by the embodiment of the present disclosure.

Please refer to FIG. 6, a second top view showing the display panel provided by the present embodiment of the present disclosure is provided.

In the present embodiment, the first recess part 121 and the second recess part 122 both have an independent recess structure surrounding the display area 100.

Specifically, the first recess part 121 and the second recess part 122 both have the independent recess structures surrounding the display area 100, and the frame sealant 30 is filled in the first recess part 121 and the second recess part 122 to form the first protrusion 31 corresponding to the first recess part 121 and the second protrusion 32 corresponding to the second recess part 122.

Furthermore, the organic layer 12 includes multiple recess parts 121 which can be formed by a halftone process. Wherein, a halftone mask includes a translucent area, and the first recess parts 121 are formed on a part of the organic layer 12 corresponding to the translucent area. The organic layer 12 includes multiple second recess parts 122, and the second recess parts 122 can be formed by a lithography process. Wherein, the lithography process includes a transparent area, and the second recess parts 122 are formed on a part of the organic layer 12 corresponding to the transparent area. The frame sealant 30 includes multiple first protrusions 31 and multiple second protrusions 32.

It should be understood that the present embodiment does not limit a number of the first recess part 121, a number of the second recess part 122, a number of the first protrusion 31, and a number of the second protrusion 32.

It should be noted that, in the present embodiment, a cross-sectional shape of the first recess part 121, a cross-sectional shape of the second recess part 122, a cross-sectional shape of the first protrusion 31, and a cross-sectional shape of the second protrusion 32 include, but are not limited to, a triangle, a rectangle, or an arc. Wherein, the cross-sectional shape of the first recess part 121 and the cross-sectional shape of the first protrusion 31 are same, and the cross-sectional shape of the second recess part 122 and the cross-sectional shape of the second protrusion 32 are same.

In the present embodiment, both the first recess part 121 and the second recess part 122 have the independent recess structure disposed along a position where the frame sealant 30 is disposed. The frame sealant 30 includes the first protrusion 31 corresponding to the first recess part 121 and the second protrusion 32 corresponding to the second recess part 122, thereby attaching four edges of the first substrate 10 to four edges of the second substrate 20. Therefore, applied forces concentrated in the frame sealant 30 can be dispersed. As such, the frame sealant 30 can be prevented from being peeled off from the first substrate 10.

Figure 7:
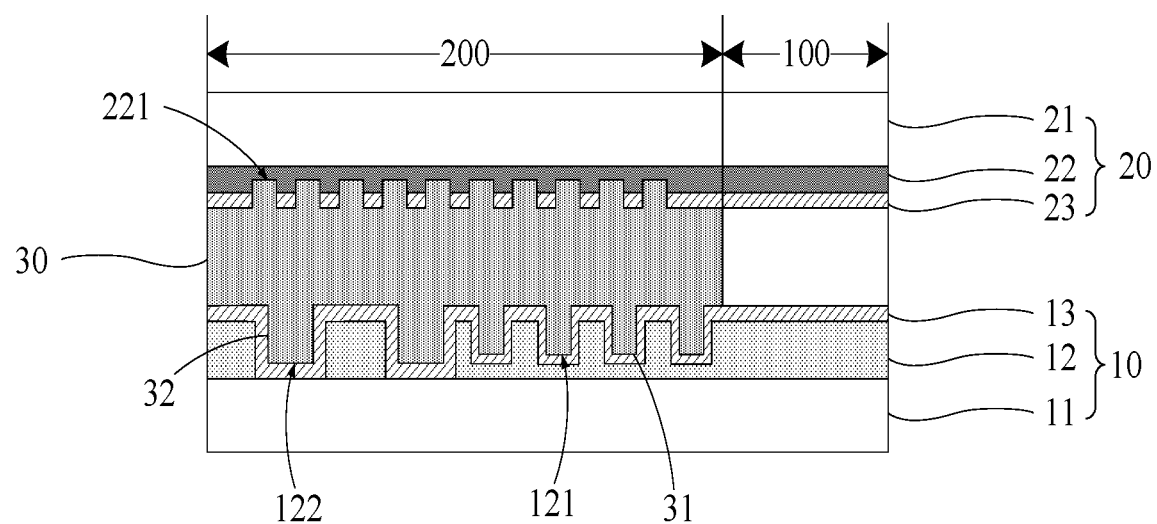
FIG. 7 is a second structural schematic view showing the display panel provided by the embodiment of the present disclosure.

Please refer to FIG. 7, a second structural schematic view showing the display panel provided by the present embodiment of the present disclosure is provided.

In the present embodiment, the second substrate 20 includes a second base 21 and a black barrier 22 disposed on a side of the second base 21 adjacent to the first substrate 10. The black barrier 22 includes a third recess part 221 defined in the non-display area, and the frame sealant 30 is filled in the third recess part 221. Wherein, a depth of the third recess part 221 is less than a thickness of the black barrier 22.

In the present embodiment, the black barrier 22 includes, but is not limited to, a black matrix. It should be understood that, in the present disclosure, the third recess part 221 is defined on the black barrier 22 in the non-display area, the frame sealant 30 is filled in the third recess part 221, and the depth of the third recess part 221 is less than the thickness of the black barrier 22. Therefore, the relative contact area between the frame sealant 30 and the second substrate 20 can be increased. As such, strength of adhesion between the frame sealant 30 and the second substrate 20 can be increased, thereby improving the capability of the display panel to pass the peeling tests.

Furthermore, the second substrate 20 includes a second alignment layer 23 disposed on a side of the black barrier 22 adjacent to the first substrate 10. The alignment layer 23 includes a second opening (not shown) corresponding to the third recess part 221, and the frame sealant 30 is filled in the second opening and the third recess part 221. It should be understood that, in the present embodiment, the second alignment layer 23 is disposed on the side of the black barrier 22 adjacent to the first substrate 10, and the second alignment layer 23 includes the second opening corresponding to the third recess part 221. Therefore, the relative contact area between the frame sealant and the second substrate 20 can be increased. As such, strength of adhesion between the frame sealant 30 and the second substrate 20 can be increased, thereby improving the capability of the display panel to pass the peeling tests.

It should be noted that, in the present embodiment, the black barrier 22 and the second alignment layer 23 are sequentially disposed on the side of the second substrate 21 adjacent to the first substrate 10. Then, the second opening is defined on the second alignment layer 23. Finally, the third recess part 221 is formed on a position corresponding to the second opening by a halftone process.

An embodiment of the present disclosure further provides a mobile terminal including the display panel of the above-mentioned embodiments and a terminal main body, wherein the display panel and the terminal main body are integrated.

Wherein, a specific structure of the display panel can be referred to any one of the above-mentioned embodiments and is not described again here.

In the present embodiment, the terminal main body main includes a middle frame, a frame sealant, etc., and is not limited here.

In specific applications, the mobile terminal may be a smartphone, a tablet, a notebook, a smart wristband, a smartwatch, a smart glass, a smart helmet, a desktop computer, a smart television, a digital camera, etc.

In summary, the present disclosure discloses a display panel and a mobile terminal. The display panel includes a first substrate and a second substrate disposed opposite to each other, and a liquid crystal layer and a frame sealant disposed between the first substrate and the second substrate. The display panel includes a display area and a non-display area adjacent to the display area. The frame sealant is disposed in the non-display area. Wherein, the first substrate includes a first base and an organic layer disposed on a side of the first base adjacent to second substrate. The organic layer includes a first recess part defined in the non-display area, and the frame sealant is filled in the first recess part. A depth of the first recess part is less than a thickness of the organic layer. In the present embodiment, the first recess part is defined on the organic layer in the non-display area, the frame sealant is filled in the first recess part, and the depth of the first recess part is less than the thickness of the organic layer. Therefore, a relative contact area between the frame sealant and the first substrate is increased. As such, strength of adhesion between the frame sealant and the substrate is increased, thereby improving a capability of the display panel to pass peeling tests.

It should be noted that many changes and modifications to the described embodiments can be carried out by those skilled in the art, and all such changes and modifications are intended to be included within the scope of the appended claims.

What is claimed is:

1. A display panel, comprising a first substrate and a second substrate disposed opposite to each other, and a liquid crystal layer and a frame sealant which are disposed between the first substrate and the second substrate;
wherein the display panel comprises a display area and a non-display area adjacent to the display area, and the frame sealant is disposed in the non-display area; and
the first substrate comprises a first base and an organic layer disposed on a side of the first base adjacent to the second substrate, the organic layer comprises a plurality of first recess parts defined in the non-display area, the frame sealant is filled in the plurality of first recess parts, and a depth of each of the plurality of first recess parts is less than a thickness of the organic layer;
wherein the organic layer comprises a plurality of second recess parts defined in the non-display area, the frame sealant is filled in the plurality of second recess parts, a depth of each of the plurality of the second recess parts is equal to the thickness of the organic layer;
wherein a distance between each of the plurality of second recess parts and the display area is greater than a distance between each of the plurality of first recess parts and the display area;
wherein each of the plurality of first recess parts has a plurality of sub-first recess parts, and the plurality of sub-first recess parts is spaced and apart from each other around the display area; and wherein each of the plurality of second recess parts has a plurality of sub-second recess parts, and the plurality of sub-second recess parts is continuously on sides of the display area and is spaced and apart from each other at corners of the display area.

2. The display panel of claim 1, wherein the first substrate comprises a plurality of metal lines disposed between the first base and the organic layer; and
an orthographic projection of the first recess part on the first base at least overlaps a part of an orthographic projection of the metal lines on the first base.

3. The display panel of claim 2, wherein the second recess part is defined between the metal lines.

4. The display panel of claim 3, wherein the first substrate comprises a first alignment layer disposed between the organic layer and the frame sealant, the depth of the first recess part is greater than a thickness of the first alignment layer, and the first alignment layer is attached to a surface of the organic layer and an internal wall of the first recess part.

5. The display panel of claim 3, wherein the first substrate comprises a first alignment layer disposed between the organic layer and the frame sealant; and
the first alignment layer comprises a first opening corresponding to the first recess part, and the frame sealant is filled in the first opening and the first recess part.

6. The display panel of claim 1, wherein the second substrate comprises a second base and a black barrier disposed on a side of the second base adjacent to the first substrate, the black barrier comprises a plurality of third recess parts defined in the non-display area, and the frame sealant is filled in the plurality of third recess parts; and
a depth of each of the plurality of third recess parts is less than a thickness of the black barrier.

7. The display panel of claim 6, wherein the second substrate comprises a second alignment layer disposed on a side of the black barrier adjacent to the first substrate; and
the second alignment layer comprises a second opening corresponding to the third recess part, and the frame sealant is filled in the second opening and the third recess part.

8. The display panel of claim 1, wherein the plurality of first recess parts have different depths.

9. A mobile terminal, comprising a terminal main body and a display panel which are integrated, wherein the display panel comprises a first substrate and a second substrate disposed opposite to each other, and a liquid crystal layer and a frame sealant which are disposed between the first substrate and the second substrate;
wherein the display panel comprises a display area and a non-display area adjacent to the display area, and the frame sealant is disposed in the non-display area; and
the first substrate comprises a first base and an organic layer disposed on a side of the first base adjacent to the second substrate, the organic layer comprises a plurality of first recess parts defined in the non-display area, the frame sealant is filled in the plurality of first recess parts, and a depth of each of the plurality of first recess parts is less than a thickness of the organic layer;

wherein the organic layer comprises a plurality of second recess parts defined in the non-display area, the frame sealant is filled in the plurality of second recess parts, a depth of each of the plurality of the second recess parts is equal to the thickness of the organic layer;

wherein a distance between each of the plurality of second recess parts and the display area is greater than a distance between each of the plurality of first recess parts and the display area;

wherein each of the plurality of first recess parts has a plurality of sub-first recess parts, and the plurality of sub-first recess parts is spaced and apart from each other around the display area; and wherein each of the plurality of second recess parts has a plurality of sub-second recess parts, and the plurality of sub-second recess parts is continuously on sides of the display area and is spaced and apart from each other at corners of the display area.

10. The mobile terminal of claim 9, wherein the first substrate comprises a plurality of metal lines disposed between the first base and the organic layer; and an orthographic projection of the first recess part on the first base at least overlaps a part of an orthographic projection of the metal lines on the first base.

11. The mobile terminal of claim 10, wherein the second recess part is defined between the metal lines.

12. The mobile terminal of claim 11, wherein the first substrate comprises a first alignment layer disposed between the organic layer and the frame sealant, the depth of the first recess part is greater than a thickness of the first alignment layer, and the first alignment layer is attached to a surface of the organic layer and an internal wall of the first recess part.

13. The mobile terminal of claim 11, wherein the first substrate comprises a first alignment layer disposed between the organic layer and the frame sealant; and the first alignment layer comprises a first opening corresponding to the first recess part, and the frame sealant is filled in the first opening and the first recess part.

14. The mobile terminal of claim 9, wherein the second substrate comprises a second base and a black barrier disposed on a side of the second base adjacent to the first substrate, the black barrier comprises a plurality of third recess parts defined in the non-display area, and the frame sealant is filled in the plurality of third recess parts; and a depth of each of the plurality of third recess parts is less than a thickness of the black barrier.

* * * * *